US010789928B2

(12) United States Patent
Lagier et al.

(10) Patent No.: US 10,789,928 B2
(45) Date of Patent: Sep. 29, 2020

(54) OMNIDIRECTIONAL ANTENNA

(71) Applicant: THALES, Courbevoie (FR)

(72) Inventors: Yves Lagier, Valbonne (FR); Raphaël Lardat, Valbonne (FR); Daniel Andreis, Valbonne (FR)

(73) Assignee: THALES, Courbevoie (FR)

( * ) Notice: Subject to any disclaimer, the term of this patent is extended or adjusted under 35 U.S.C. 154(b) by 80 days.

(21) Appl. No.: 15/514,373

(22) PCT Filed: Sep. 25, 2015

(86) PCT No.: PCT/EP2015/072131
§ 371 (c)(1),
(2) Date: Mar. 24, 2017

(87) PCT Pub. No.: WO2016/046377
PCT Pub. Date: Mar. 31, 2016

(65) Prior Publication Data
US 2017/0301332 A1 Oct. 19, 2017

(30) Foreign Application Priority Data
Sep. 26, 2014 (FR) ...................................... 14 02168

(51) Int. Cl.
*H04B 11/00* (2006.01)
*G10K 11/00* (2006.01)

(52) U.S. Cl.
CPC .................................. *G10K 11/008* (2013.01)

(58) Field of Classification Search
None
See application file for complete search history.

(56) References Cited

U.S. PATENT DOCUMENTS 3,139,603 A * 6/1964 Church ................. B06B 1/0622 367/157
3,177,382 A * 4/1965 Green ................... B06B 1/0633 310/334

(Continued)

FOREIGN PATENT DOCUMENTS

CN 202 042 175 U 11/2011
FR 1 303 023 A1 9/1962

(Continued)

OTHER PUBLICATIONS

Subash Chandrabose et al., "Oil filled free flooded ring transducer for deep submergence applications," 2013 Ocean Electronics, Oct. 23, 2013, pp. 1-5, XP032540475.

*Primary Examiner* — Hovhannes Baghdasaryan
*Assistant Examiner* — Jonathan D Armstrong
(74) *Attorney, Agent, or Firm* — Baker & Hostetler LLP

(57) ABSTRACT

An omnidirectional antenna to equip a sonar, the antenna centered around a longitudinal axis and comprises an assembly of emission rings stacked along the longitudinal axis, each emission ring formed around the longitudinal axis. The emission rings are assembled in groups of ring, the antenna comprises at least two groups of rings and each group of rings comprises at least two rings, the inter-ring spacings between the rings of one and the same group and the inter-group spacings between two successive groups of rings chosen so as to optimize the emission bandwidth and the sound level.

14 Claims, 6 Drawing Sheets

(56) References Cited

U.S. PATENT DOCUMENTS 3,274,537 A * 9/1966 Toulis .................... G01V 1/145 367/155
3,329,408 A * 7/1967 Branson .................... B08B 3/12 310/325
3,461,910 A * 8/1969 Selsam ..................... G01S 1/72 137/624.15
3,583,677 A * 6/1971 Phillips ................. B06B 1/0611 166/177.7
3,728,725 A * 4/1973 Bauer ....................... G01S 7/06 342/111
4,100,527 A * 7/1978 Tocquet ................ B06B 1/0618 310/337
4,373,143 A * 2/1983 Lindberg ............. G10K 11/343 310/334
4,413,331 A * 11/1983 Rowe, Jr. .............. B06B 1/0633 310/327
4,546,459 A * 10/1985 Congdon .............. B06B 1/0655 367/155
4,689,773 A * 8/1987 Congdon .............. B06B 1/0655 367/159
4,777,627 A * 10/1988 Congdon ............. G10K 11/006 367/159
4,850,450 A * 7/1989 Hoyle .................... G01V 1/523 181/102
4,970,706 A * 11/1990 Tocquet ................ B06B 1/0618 367/158
5,068,836 A * 11/1991 Steel ...................... G10K 9/121 181/182
5,270,985 A * 12/1993 Thomas ................. G01V 1/135 181/106
5,363,345 A * 11/1994 Boucher ............... B06B 1/0618 310/322
5,367,501 A * 11/1994 Kelly .................... B06B 1/0607 114/21.2
5,371,330 A * 12/1994 Winbow .................. G01V 1/02 166/177.2
5,418,335 A * 5/1995 Winbow .................. G01V 1/02 166/177.2
6,135,234 A * 10/2000 Harris ................... B06B 1/0655 181/106
6,193,010 B1 * 2/2001 Minto .................... G01V 1/135 181/102
6,404,701 B1 * 6/2002 Stottlemyer ......... G10K 11/008 367/106
6,643,221 B1 * 11/2003 Hsu ........................ G01V 1/523 166/249
6,690,620 B1 * 2/2004 Mapes ................... G10K 11/02 367/152
7,406,001 B1 * 7/2008 Dzikowicz ................ G01S 1/82 367/138
9,286,878 B2 * 3/2016 Buccafusca ............ G10K 9/122
2003/0160546 A1 8/2003 Osborn
2003/0235115 A1 * 12/2003 Porzio ................... B06B 1/0614 367/158
2007/0090723 A1 * 4/2007 Keolian ................... H02N 2/18 310/311
2007/0286026 A1 12/2007 Shiba
2011/0122731 A1 * 5/2011 Buccafusca ............ G10K 9/122 367/162
2012/0163126 A1 * 6/2012 Campbell ............. B06B 1/0614 367/135
2013/0114378 A1 * 5/2013 Rolt ...................... B06B 1/0655 367/157
2013/0163386 A1 * 6/2013 Sallas .................... G01V 1/047 367/189
2016/0130936 A1 * 5/2016 Khajeh ................... E21B 47/14 367/25
2016/0193629 A1 * 7/2016 Hardie .................. B06B 1/0633 310/337
2016/0327640 A1 * 11/2016 Seite .................... G10K 11/008

FOREIGN PATENT DOCUMENTS

FR 2 766 161 A1 9/1999
WO 02/47065 A1 6/2002
WO 2015/092066 A1 6/2015

* cited by examiner

OMNIDIRECTIONAL ANTENNA

CROSS-REFERENCE TO RELATED APPLICATIONS

This application is a National Stage of International patent application PCT/EP2015/072131, filed on Sep. 25, 2015, which claims priority to foreign French patent application No. FR 1402168, filed on Sep. 26, 2014, the disclosures of which are incorporated by reference in their entirety.

FIELD OF THE INVENTION

The invention relates in a general manner to antennas, and in particular to omnidirectional antennas.

BACKGROUND

Marine platforms (for example surface boats) are generally equipped with immersed sonar antennas for detecting and/or pinpointing objects under the water. A sonar antenna comprises an assembly of stacked transducers ensuring the emission of the acoustic signals and mounted on a support. The reception of the signals is performed by an assembly of receivers (for example hydrophones) arranged according to a chosen configuration with respect to the configuration of the assembly of the emission transducers.

In existing embodiments, the antenna has a generally cylindrical or spherical shape and comprises an assembly of elementary emission transducers (piezoelectric rings) superposed along the axis of the antenna, each transducer having a ring shape as described in application FR2 776 161.

Such transducers can be of "Tonpilz" type and ensure both emission and reception. However, the diameter of the rings being related to the desired emission frequency, the lower the desired frequency, the larger the ring must be. Such antennas are therefore bulky and have a relatively significant weight. Moreover, transducers of "Tonpilz" type make it necessary to equip the active element (piezoelectric, magneto- or electro-strictive material) with bulky mechanical components (rear seismic mass, pavilion and leaktight casing in particular). Such an antenna architecture is therefore unsuitable for the design of low-frequency antennas for surface vessels of low tonnage (in particular less than 1500 Tonnes in mass) or for submarines of low tonnage (in particular less than 6000 Tonnes in mass).

In another known approach, the omnidirectional sonar antenna comprises a vertical array of compact transducers of "flex-tensor" type operating in a reduced frequency band in active mode (1800-2300 Hz). This type of antenna is dedicated to emission alone. This architecture is sufficiently compact and exhibits a relatively low weight. However, antennas of this type do not make it possible to obtain the frequency band width necessary for modern wide-band sonars.

Another known architecture of omnidirectional sonar antenna comprises a vertical array of active emission rings, in which the interior of the rings is insulated from the medium in which the antenna bathes (according to a technology called "Air Backed Ring" or ABR). This type of antenna is used in particular for heliborne-sonar applications, such as for example the solution described in patent application FR 1303023, and exhibits the advantage of offering greater compactness with low weight. However, these antennas are limited in terms of frequency band on account of the mono-resonant behavior of the active rings used in ABR mode.

In yet other embodiments, as described for example in patent EP1356450B1, the omnidirectional sonar antenna comprises a vertical array of compact and wideband emission transducers, whose walls are in contact with a fluid in the liquid state (according to a technology called "Free-flooded Rings" or FFR). The presence of liquid improves the acoustic performance of the antenna. Reception is ensured by an assembly of omnidirectional hydrophones placed on a lightweight structure transparent to acoustic waves in the frequency band used.

This type of omnidirectional sonar antenna architecture is particularly suitable for the towed SONAR antennas of surface vessels and for certain hull SONARs for surface vessels. The antennas embodied with FFR rings addressing the medium frequency region can be relatively compact and wide-band. However, such antennas exhibit limitations in terms of compactness and performance in respect of sound level and bandwidth which are due mainly:

to the presence around the active elements of metallic and/or elastomeric leaktightness devices; and to the regular spacing between the rings.

SUMMARY OF THE INVENTION

The aim of the invention is in particular to alleviate the aforementioned drawbacks, by proposing an omnidirectional antenna intended to equip a sonar, the antenna being centered around a longitudinal axis and comprising an assembly of emission rings stacked along the longitudinal axis, each emission ring being formed around the longitudinal axis. Advantageously, the emission rings are assembled in groups of rings, the antenna comprising at least two groups of rings and each group of rings comprising at least two rings. The inter-ring spacings between the rings of one and the same group and the inter-group spacings between two successive groups of rings are chosen so as to optimize the emission bandwidth and the sound level. In particular, the inter-ring spacings between the rings of one and the same group can be a function of the cavity frequency of the group of rings while the inter-group spacings between two successive groups of rings are a function of the frequency of operational use of the emission rings.

According to a characteristic, the rings can be made of piezoelectric material.

In one embodiment, the sum of the inter-group spacing between two groups of rings (p), of the inter-ring spacing (d) between two of rings and of twice the height (h) of a ring can be substantially equal to half the wavelength of the frequency of operational use of the emission rings (20).

According to another characteristic, the inter-ring spacing between the rings of one and the same group can also be chosen as a function of the radial frequency of the group of rings.

According to another characteristic, the inter-ring spacing between two rings of one and the same group can in particular be chosen so as to position the cavity frequency of the group of rings below the radial frequency of said ring.

In particular, the cavity frequency of each ring can be coupled with the radial frequency of said ring.

According to another characteristic, the emission rings can be immersed directly in a dielectric fluid.

The internal cavity of each emission ring can in particular be in contact with the dielectric fluid.

In one embodiment, the antenna can be housed in a leaktight enclosure filled with the dielectric fluid.

The enclosure can also be over-pressurized or be placed in hydrostatic equilibrium with the exterior medium.

According to another characteristic, the rings are fed group-wise in parallel.

The inter-ring spacing between two rings can vary within one and the same group.

The inter-group spacing between two groups of the antenna can vary for the assembly of groups of the antenna.

The proposed embodiments thus make it possible to reduce the mass and the volume of the acoustic emission antenna of the SONAR, as well as its complexity of embodiment, while optimizing the sound level and the bandwidth of emission frequencies, thus making it possible to obtain optimal acoustic performance.

DESCRIPTION OF THE FIGURES

Other characteristics and advantages of the invention will become apparent with the aid of the description which follows and of the figures of the appended drawings in which.

The drawings and the annexes to the description will be able not only to serve to better elucidate the description, but also to contribute to the definition of the invention, if appropriate.

DETAILED DESCRIPTION

Figure 1:
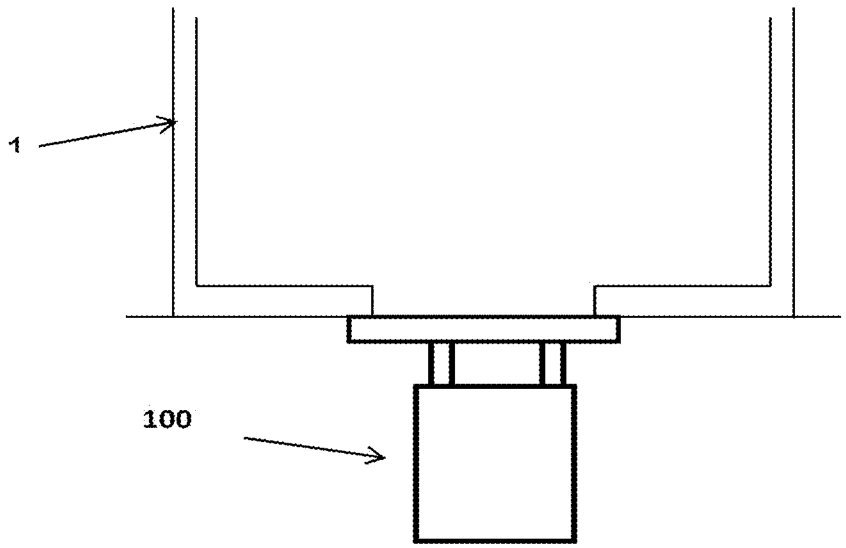
FIG. 1 is a diagram representing an exemplary marine platform on which an omnidirectional antenna according to the various embodiments can be fixed.

FIG. 1 is a diagram representing an exemplary structure 1 on which may be mounted an omnidirectional antenna 100, according to certain embodiments.

The omnidirectional antenna 100 is intended to be immersed at least partially in the water (for example at sea) to detect objects under the water by emission of sound waves. It can be mounted on any fixed or mobile structure 1, such as for example under a floating or anchored marine platform or a surface vessel as illustrated in FIG. 1.

Figure 2:
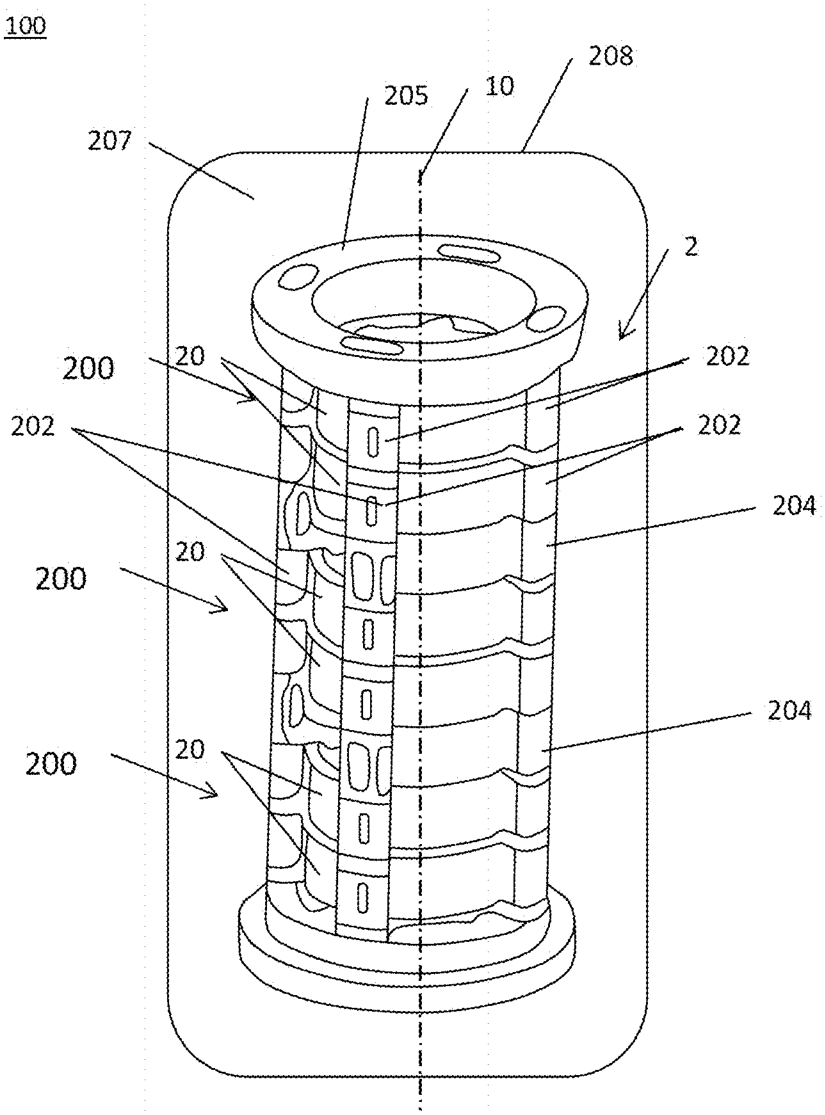
FIG. 2 is a perspective view of an omnidirectional sonar antenna, according to one embodiment of the invention.

FIG. 2 illustrates the arrangement of the various elements of the antenna according to certain embodiments.

The omnidirectional antenna 100 comprises an emission base 2 comprising an assembly of elementary transducers 200 stacked along an axis 10 (hereinafter called the "longitudinal axis of the antenna"), the transducers being configured to emit sound waves. The antenna 100 can in particular be fixed on the bottom of the structure 1. The emission transducers 200 can cooperate with a reception base 3 comprising an assembly of omnidirectional receivers for receiving the signals. In particular, the emission base (forming an emission antenna) consisting of the elementary transducers 200 can be distinct from the reception base (forming a reception antenna).

In one embodiment, the omnidirectional antenna 100 can be a sonar antenna intended to equip an active sonar. The subsequent description will be given with reference to an antenna 100 of sonar antenna type by way of nonlimiting example. In such an embodiment, the receivers of the emission base are hydrophones.

The omnidirectional antenna 100 can have a generally cylindrical shape so as to be omnidirectional in terms of bearing. The elevational directivity depends on its extension along its axis of revolution 10.

The elementary transducers 200 comprise an assembly of emission rings 20, each ring being centered around an axis parallel to the axis 10 of the antenna 100. The emission rings 20 are superposed along the longitudinal axis of the antenna. In particular, the emission rings can be substantially identical and centered around the longitudinal axis of the antenna 100. The diameter D of each ring 20 is suitable for the emission frequency.

According to one aspect of the invention, the rings 20 are assembled in groups, each group constituting an elementary transducer 200 (in the subsequent description, the groups of rings will thus be designated by the reference 200). The groups of rings 200 are spaced apart by a chosen pitch (the pitch will also be called the "intergroup spacing" hereinafter) in the direction of stacking, defined by the axis 10.

According to another characteristic, each group 200 (elementary emission transducer) comprises a chosen number of rings. In one embodiment, the various groups of rings 200 comprise the same number of rings and are spaced apart by one and the same distance (i.e. the intergroup spacing is identical between the various groups).

In the embodiment of FIG. 2, the emission base 2 comprises three mutually spaced pairs of rings, according to the same chosen intergroup spacing (denoted "p"), and each group of rings 200 comprises a pair of rings.

The groups of rings 200 are held in position by a holding structure.

The antenna 100 can be linked up via cables or connectors to electronic equipment disposed for example on the structure 1 and configured to feed electrical power to the antenna 100 and to ensure the exchange of data with the antenna 100. In particular, each emission ring 20 can be controlled separately by means of a power amplifier so as to produce a downward elevational emission lobe, for example by acoustic decoupling. As a variant, each group of rings 200 can be fed separately, using parallel feed.

Such a configuration of the rings 20 makes it possible to optimize the emission bandwidth of the antenna and the sound level.

In certain embodiments, the reception base 3 can be placed coaxially with the emission base.

According to another characteristic, securing tie rods 202 can be used to fasten the rings of one and the same group together or of the whole antenna, as illustrated in FIG. 2. The tie rods 202 may be for example metallic tie rods.

As a supplement, inter-group clamping blocks 204 can be placed in the gaps separating two successive groups of rings. The clamping blocks 204 can form part of the assemblage and can take for example the form of plastic blocks through which the tie rods 202 pass. The tie rods 202 can comprise metallic tie rods passing through the plastic blocks which serve as blocks. The assembly of elements of the emission base 2 can be clamped between the components 205 (annulus) which allow mechanical solidity of the emission antenna independently of all of the surrounding structure. One of the annuli 205 can form the interface with the support structure 1 represented in FIG. 1.

In the embodiments where the rings are of substantially identical dimensions and centered around the longitudinal axis of the antenna 10, they can be superposed one above another so that the inter-group clamping blocks 204 be opposite one another in the direction defined by the longitudinal axis 10.

The antenna 100 can furthermore comprise a profiled annulus 205 whose diameter is at least equal to the diameter of the rings placed at each end of the stack to hold the assembly of rings and facilitate installation of the emission antenna 100.

Figure 3:
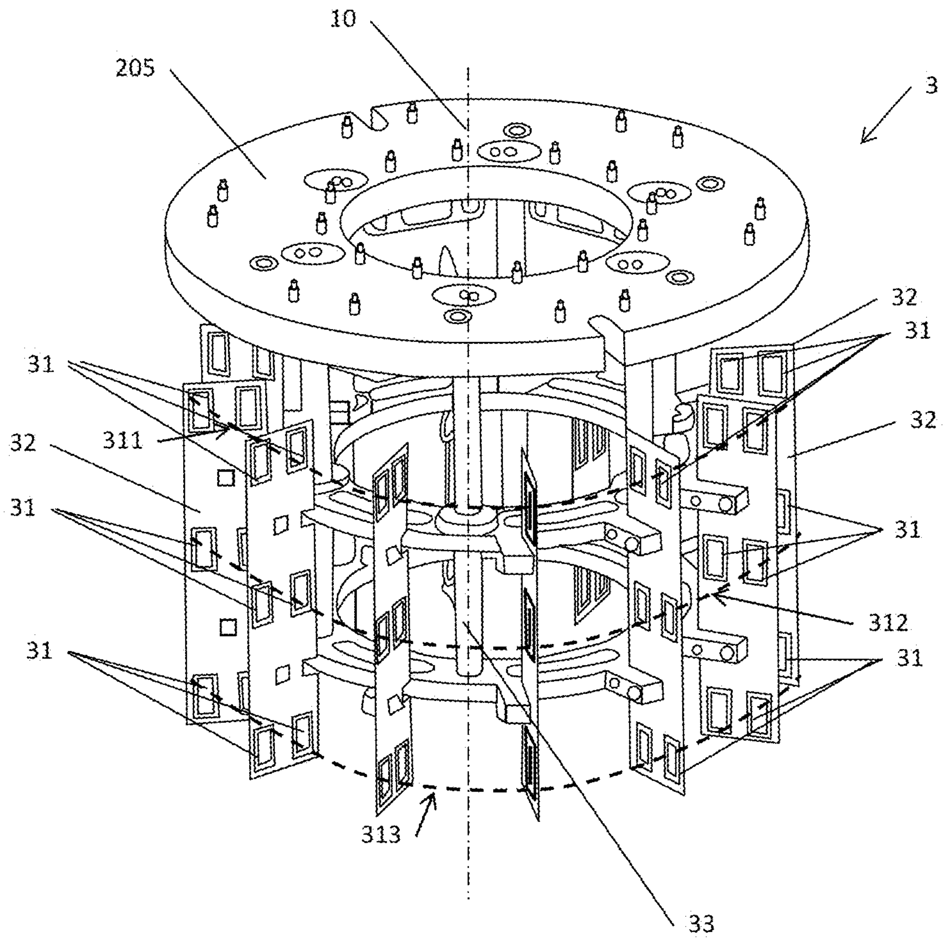
FIG. 3 is a perspective view of an exemplary reception base.

FIG. 3 illustrates an example of positioning of the reception base 3. In the example of FIG. 3, the receivers 31 are hydrophones fixed on the mechanical holding structure 33 of the emission base 2. The holding structure 33 can be in particular transparent to acoustic waves in the frequency band used.

The assembly of receivers 31 can form part of the emission antenna's mechanical holding structure. The receivers 31 of the reception antenna 3 can for example be hydrophones distributed around the emission antenna 100 and with no physical link with the emission antenna 100.

In particular, the receivers 31 forming the reception antenna can be disposed substantially column-wise or quincuncially on the holding structure 33 surrounding the emission antenna, along the longitudinal axis 10.

As represented in FIG. 3, the hydrophones 31 can comprise an assembly of elementary hydrophones distributed around the emission antenna 100 on supports 32 and with no physical link with the emission antenna 100. In the embodiment of FIG. 3, the elementary hydrophones are arranged as three coaxial annuli represented schematically by the dashed curves 311, 312 and 313 and centered around the axis 10. The annuli 311, 312 and 313 are spaced a chosen distance apart, along the axis 10.

The emission antenna 100 can be arranged inside the holding structure 33 and held by the latter.

Figure 4:
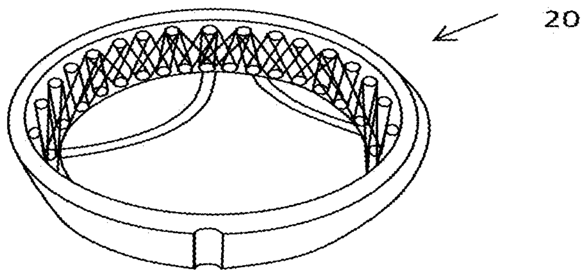
FIG. 4 represents an exemplary elementary ring structure.
Figure 5:
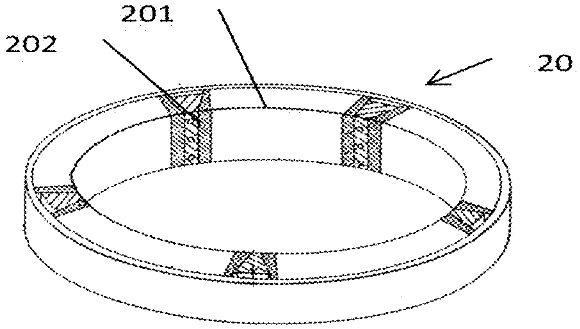
FIG. 5 represents another exemplary elementary ring structure.

The emission rings 20 can be active rings made of piezoelectric material (for example active rings of piezoelectric ceramic). Each ring 20 can for example comprise an assembly of segments placed inside an annulus of insulating substance (made for example of glass fiber/resin wound directly on the ceramics) as represented in FIG. 4 or in the form of a composite ring forming a shrink ring as represented in FIG. 5. Such segments 201 can be separated from one another by metallic components in the form of wedges 202 that can be moved toward the center of the ring by means of a device, thus making it possible to part the segments and to impose a mechanical prestress in the ceramic ring. The segments can be overlaid against a shrink fitting annulus (or assembled by gluing). In particular, each ring can be a ring prestressed by a jig formed of an assembly of piezoelectric segments grouped to form substantially identical sectors.

Figure 6:
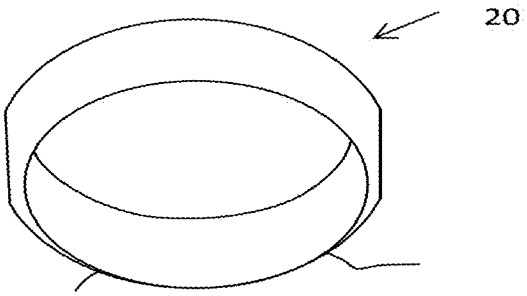
FIG. 6 represents yet another exemplary elementary ring structure.

As a variant, each ring can be produced as a single ceramic component (monolithic shape) as illustrated in FIG. 6.

In certain embodiments, the emission antenna and/or the internal cavity of the emission rings 20 can bathe in a non-ionic dielectric fluid 207, such as for example oil.

In particular, the emission antenna 100 can be placed in a leaktight enclosure 208 which can be over-pressurized and which can contain the non-ionic dielectric fluid 207. Thus, it is not necessary to use an electrical insulation and/or leaktightness device around the emission rings 20 (such as for example a shrouding, an overmolding around the rings or mechanical components for electrical insulation and leaktightness of the rings).

The elimination of leaktight sealing by visco-elastic substance makes it possible to minimize the losses through heating of these substances and thus to discernibly increase the electro-acoustic efficiency. The conventional efficiency of about 50% obtained with conventional emission antennas can be increased to about 75%.

As a supplement, it may be useful to provide a fine layer of varnish on the rings mainly to protect the rings during their manipulation or their transport in the phase of assembling the omnidirectional antenna 100.

By eliminating all the losses induced by the presence of the materials usually used to achieve the leaktightness and electrical insulation functions, the electro-acoustic efficiency of each emission ring 20, and therefore the "sound level to overall volume" ratio and the "sound level to mass" ratio of the emission antenna 100, are optimized.

The dielectric fluid 207 in which the emission rings 20 bathe can furthermore have a heat sink function for draining the heat generated by the active rings during emission. Indeed, it behaves as a heat-carrying fluid which cools the ceramic rings by natural convection in particular, thus making it possible to optimize the sound level emitted and the duration of use at full load.

In the embodiments where the rings 20 bathe in the fluid 207, each ring 20 constitutes a vibrating ring in a surrounding fluid and therefore exhibits at least two resonant frequencies acoustically coupled to the fluid:

a radial mode, obtained on the basis of alternations of extension/compression of the constituent material of the ring, in which the deformation of the ring corresponds to such alternations of radial extension/compression around the rest position of the ring;

a cavity mode, obtained by setting the fluid contained inside the volume defined by the ring and depending, to first order, on the height of the ring into resonance.

The cavity mode can be activated by feeding each group of rings in parallel.

In the embodiment where each emission ring 20 is made of piezo-electric substance, the energy necessary for radial resonance can be provided by the alternating electrical excitation injected on the ceramic. The energy used to set the cavity mode into resonance can likewise be induced by the radial mode of the ring.

In certain embodiments, the cavity mode and the radial mode are coupled to obtain a significant operating frequency band so that each ring 20 can operate in wideband. In particular, for each ring 20, the cavity frequency is chosen to be less than the radial frequency, thus allowing optimal operation.

Figure 7:
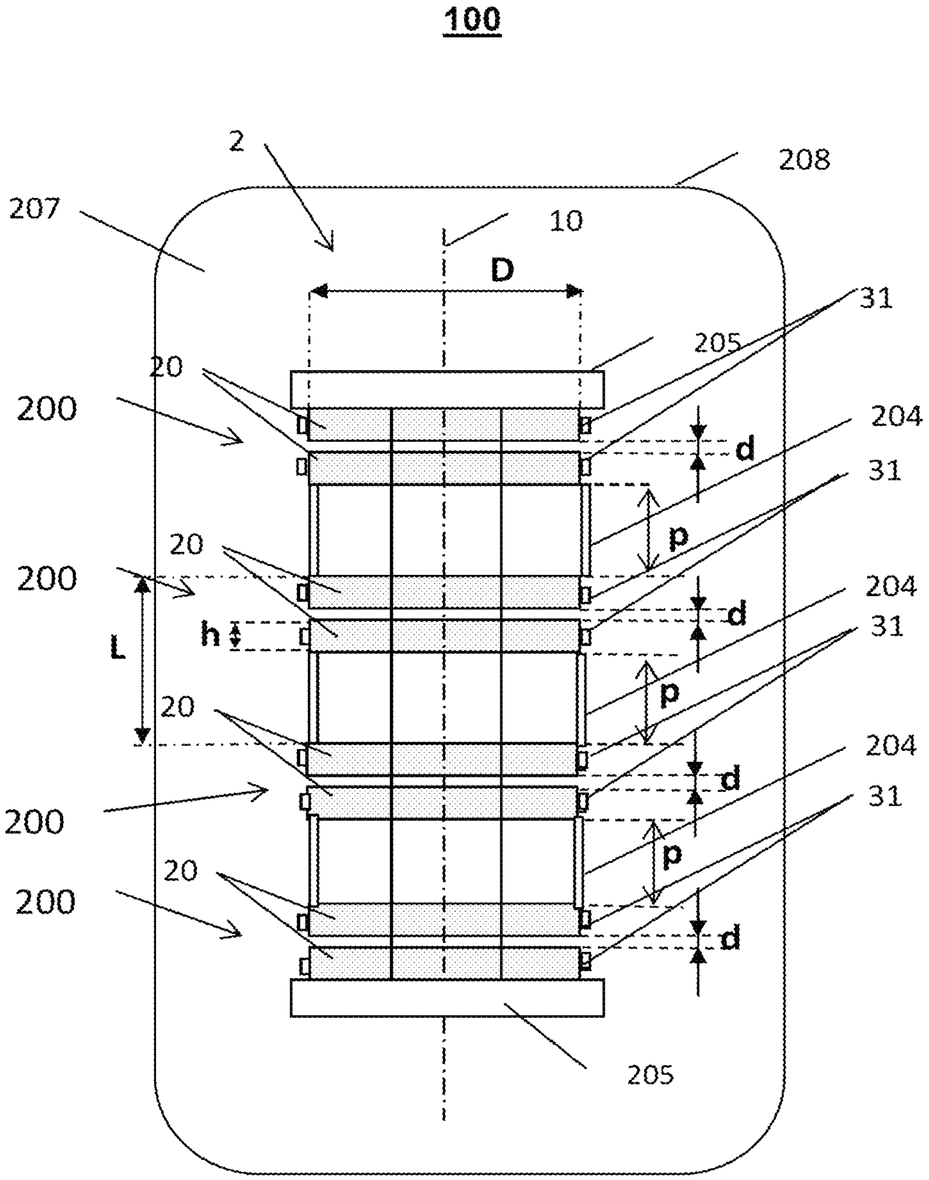
FIG. 7 is a diagram representing the omnidirectional sonar antenna, according to one embodiment.

FIG. 7 is a diagram showing in greater detail the arrangement of the emission rings 20. As shown in FIG. 7, the groups of rings 200 are a distance p apart, this constituting the "inter-group spacing". FIG. 7 shows more precisely 4 groups of rings 200, each group comprising 2 rings. According to another characteristic of the invention, the inter-group spacing p between the various groups 200 of rings is chosen so as to optimize the operation of the antenna.

According to another characteristic, the inter-ring spacing, denoted "d", between the rings of one and the same group (for example pair) is chosen so as to control the cavity frequency of the group of rings 200. In particular, the inter-ring spacing, denoted "d", between the rings of one and the same group (for example pair) is chosen as a function of the cavity frequency of the group of rings 200 and/or of the radial frequency of the ring group.

In particular, in the embodiments where the rings 20 of one and the same group 200 are placed in one and the same fluid region and where the inter-ring distance d is large compared with the wavelength of the emitted acoustic waves (representing the ratio between the speed of sound in the fluid of the region considered and the frequency of use of the antenna), the cavity frequency and the radial frequency of the ring group 200 are substantially identical to those obtained for a lone ring. In the embodiments where the spacing d is small compared with the wavelength of the emitted acoustic waves, the cavity frequency of the group of rings may drop in frequency down to the limit case where d=0. In particular, in the embodiment where d=0, the cavity frequency of the pair may be half that of the lone ring.

The omnidirectional antenna 100 can in particular be configured so that, whatever the inter-ring spacing d, the radial frequency of the elementary rings remains unchanged.

The optimization of the inter-ring spacing d for a given antenna thus makes it possible to vary the cavity frequency of the antenna and to optimize it for a given operation.

The inter-ring distance d between the elementary rings thus makes it possible for the cavity frequency of the antenna to be best positioned with respect to the needs of the antenna 100.

The inter-group spacing p between two groups of the antenna can advantageously be chosen so as to optimize the acoustic efficiency of the emission base 2. In particular, the inter-group spacing p can be chosen as a function of the frequency of operational use of the emission base. In one embodiment, the inter-group spacing p can be chosen equal to half the wavelength of the frequency of operational use of the emission base 2. The inter-group spacing p can thus be optimized either from an acoustic point of view (bandwidth and sensitivity to emission) or from a more general point of view, including the emission chain, so as to have the maximum of active power in the antenna over the largest possible frequency band.

The groups of rings separated by the inter-group distance d can be fed with an appropriate phase shift to obtain an antenna mode making it possible to emit with a steering of the main lobe along the axis of revolution of the antenna.

In the embodiments where the antenna 100 is submerged in a fluid and comprises a fluid in the internal cavity of each emission ring 20, the presence of fluid makes it possible to use the rings in FFR mode ("Free-flooded Rings" technology) and therefore to obtain wide-band operation. In the FFR mode, the internal walls of the emission rings 20 are in contact with a fluid in the liquid state.

In such an FFR mode, when the minimum inter-ring distance "d" between rings of one and the same group is chosen so as to optimize acoustic operation according to the cavity mode of the ring, the electro-acoustic efficiency obtained is much greater than that obtained with conventional omnidirectional emission antennas.

The dielectric fluid in which the emission antenna 100 bathes and/or which is in contact with the internal cavity of each ring (in the FFR mode) can have similar acoustic characteristics to water (in particular, density, speed of sound, acoustic impedance), such as for example a specific mineral oil.

The dielectric fluid can also have optimized thermal characteristics in relation to the cooling of the active rings by natural convection.

In the embodiments where the emission antenna is placed in an enclosure 208 filled with the dielectric fluid, the enclosure 208 is an acoustically transparent enclosure, such as for example made of composite material of fiber, resin (glass, carbon, . . . ), or rubber or polyurethane elastomer.

Such an enclosure 208 can be in particular over-pressurized to push back the limits in terms of cavitation of the emission antenna 100.

The enclosure 208 can furthermore be configured to be in hydrostatic equilibrium with the exterior medium, and this may be of particular interest in applications onboard variable-immersion vehicles (such as for example submarines, towed bodies, drones, etc.

As a supplement or as a variant, the enclosure 208 can be partially clad with acoustic material (for example anechoic or by masking) so as to optimize the radiation pattern of the emission antenna and/or the signal response of the antenna and/or the noise of the associated reception base (3).

The omnidirectional antenna 100 according to the various embodiments exhibits optimized compactness with respect to the conventional solutions. Indeed, the various embodiments make it possible to address the low part of the frequency band through a fluid mode which has limited dependency with respect to the physical structure of the antenna (for a given physical dimension, the frequency band is widened toward the low frequencies).

The various embodiments of the invention thus facilitate installation of the acoustic antenna on a marine platform such as a surface vessel, in particular of low tonnage and shallow draft, or on a submarine, for which the volume available as superstructures is very constrained.

The omnidirectional antenna according to the various embodiments can also be used in any type of sonar application, such as for example in applications of airborne sonar type or fixed or mobile maritime surveillance devices.

Figure 8:
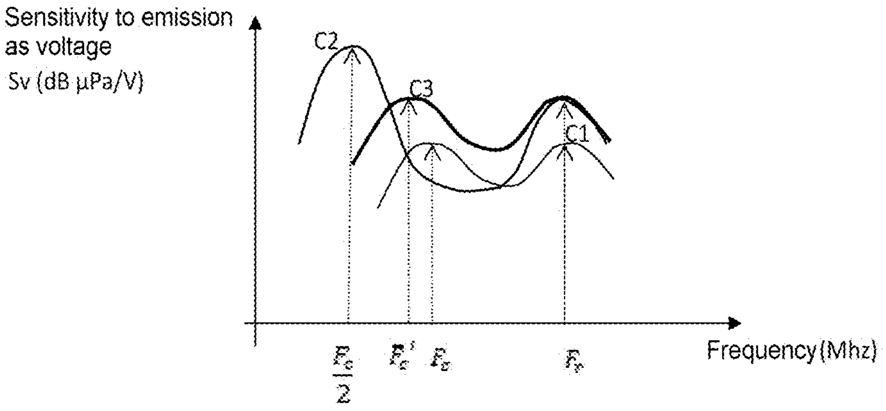
FIG. 8 represents a frequency response chart obtained with various exemplary embodiments of omnidirectional antenna.

FIG. 8 shows the frequency response chart obtained with various exemplary embodiments of omnidirectional antenna.

In the chart of FIG. 8, the horizontal axis corresponds to the frequency axis (in Hz) and the vertical axis corresponds to the sensitivity to emission (sensitivity as voltage Sv in dB μPa/V). The curves are characterized by two maxima corresponding respectively to the cavity mode and to the radial mode:

In the chart of FIG. 8:

Curve C1 corresponds to the frequency response obtained with a conventional antenna of "Free Flooded" type. The first maximum is observed at the frequency $F_c$ corresponding to operation in cavity mode and to the resonance wavelength of the cavity $\lambda_c$, while the second maximum is observed at the frequency $F_r$ corresponds to the operation in radial mode and to the wavelength $\lambda_r$.

Curve C2 corresponds to the frequency response obtained with an exemplary embodiment of omnidirectional antenna according to the prior art comprising a pair of glued rings: the maxima are attained for a frequency $$\frac{F_c}{2}$$

and $F_r$.

Curve C3 corresponds to the frequency response obtained with an exemplary embodiment of omnidirectional antenna according to the invention comprising a group of rings, the rings being spaced apart by a distance $$d = \frac{\lambda_c}{5.5} - h,$$

with h designating the height of each ring for rings of the same height (represented in FIG. 7) or $$d = \frac{\lambda_c}{5.5} - \frac{h_1}{2} - \frac{h_2}{2}$$

if the two adjacent rings of one and the same group have different heights $h_1$ and $h_2$. The subsequent description will be given with reference to rings of the same height h by way of nonlimiting example. In the exemplary embodiment corresponding to curve C3, the maxima are attained for a frequency $F'_c$, the frequency $F'_c$ being able to take all values between $$\frac{F_C}{2}$$

and $F_C$ as a function of the distance d.

The inventors have thus established that a spacing d between the rings (inter-ring spacing) of one and the same group that is very small and dependent on the resonance wavelength of the cavity $\lambda_c$ (for example $$d = \frac{\lambda_c}{5.5} - h$$

as represented on curve C3) makes it possible to optimize the response in a wider frequency band than in the conventional embodiments. Thus, the inter-ring spacing d can advantageously be chosen such that:

$d = f(\lambda_c) - h$, where $f$ is a function of $\lambda_c$.

For example, the function $f$ can be chosen equal to $$f(\lambda_c) = \frac{\lambda_c}{\alpha},$$

with $\alpha$ lying between 5 and 6.

It should be noted that this criterion relating to the spacing d between the rings can alternatively be formulated in the form of a criterion relating to the height h of the rings, given that $h = f(\lambda_c) - d$, or of a criterion relating to the distance L (represented in FIG. 7) between two successive groups of rings, with L=d+2 h+p (d designating the inter-ring distance, p the inter-group distance and h the height of the rings) as illustrated by the chart of FIG. 7.

Figure 9:
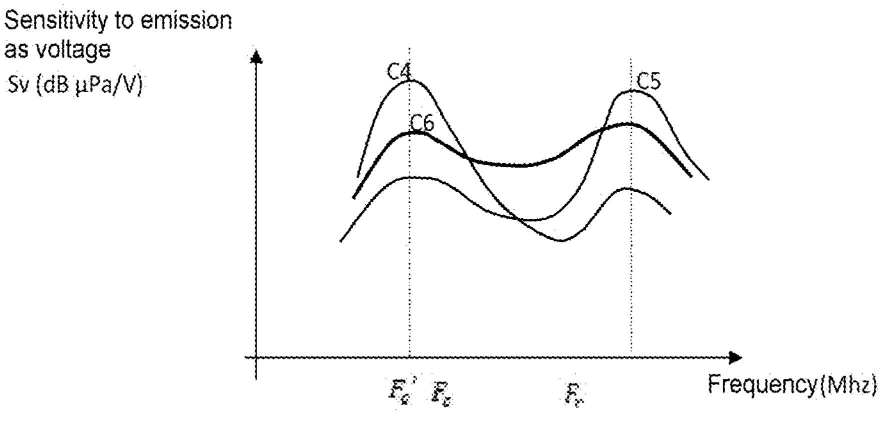
FIG. 9 represents a frequency response chart obtained with exemplary embodiments of omnidirectional antenna according to the invention comprising an assembly of stacked groups of rings.

FIG. 9 represents the frequency response obtained with an exemplary embodiment of omnidirectional antenna according to the invention comprising an assembly of stacked groups of rings 200, the rings of one and the same group of rings being spaced a distance $$d = \frac{\lambda_c}{5.5} - h$$

apart. The various curves represented in FIG. 9 (C4, C5 and C6) correspond to a distance L between two successive groups of rings taken equal to half the wavelength of the frequency of operational use of the emission rings $$\left(\frac{\lambda}{2}\right),$$

the distance L being defined by L=d+2 h+p (d designating the inter-ring distance, p the inter-group distance and h the height of the rings), for various values of frequencies.

More precisely:

curve C4 corresponds to $$L = \frac{\lambda}{2}$$

at a frequency $F'_c$;

curve C5 corresponds to $$L = \frac{\lambda}{2}$$

at a frequency $F_r$;

curve C6 corresponds to $$L = \frac{\lambda}{2}$$

at a frequency $$\frac{F'_c + Fr}{2}.$$

FIG. 9 thus shows that the frequency band obtained with certain embodiments of the invention is wider than for a conventional antenna and exhibits a sound level equalized over the whole frequency band. The inventors have established that such a result is related to the choice of the inter-group distance p and inter-ring distance d. In particular, the distances p and d can be chosen so as to optimize the sound level as a function of needs.

The various embodiments make it possible to optimize the sound level and the bandwidth of the emission frequencies. The acoustic performance of the emission antenna is advantageously optimized so as to cover the entirety of the environment conditions and propagation conditions, whether in deep water or shallow water conditions, potentially strongly reverberating.

Although not limited to such applications, the proposed embodiments have particular advantages in the field of low- and medium-frequency SONAR systems allowing the detection/classification of submarines.

The invention is not limited to the embodiments described hereinabove by way of nonlimiting example. It encompasses all the variant embodiments that could be envisaged by the person skilled in the art. In particular, the invention is not limited to a particular arrangement of the receivers 31 forming the reception antenna 3, nor to a particular architecture for embodying the emission rings 20. Nor is the invention limited to a spacing d between rings of one and the same group (inter-ring spacing) that is constant within one and the same group. For example, the inter-ring spacing d can be variable within one and the same group so as to best match the cavity modes of each group to its position in the antenna. Likewise, nor is the invention limited to an inter-group spacing p that is constant between two successive groups. A variable inter-group spacing may be for example chosen as a function of the required performance, of the position of the group with respect to the axis of the antenna, etc. Moreover, the invention is not limited to rings 20 of identical dimensions within one and the same group 20. For example, For example, the rings 20 of one and the same group 200 can have a different height. More generally, the configuration of the various groups 200 can differ from one group to another.

The invention claimed is:

1. An omnidirectional antenna intended to equip a sonar, the antenna being centered around a longitudinal axis, the antenna comprising:

an assembly of emission rings stacked along said longitudinal axis, said emission rings being directly immersed in a dielectric fluid, each emission ring being formed around said longitudinal axis, wherein each ring constitutes a vibrating ring in said dielectric fluid and comprises an internal cavity including an internal fluid, each ring presenting at least two resonance frequencies acoustically coupled to said fluid, said resonance frequencies comprising a cavity frequency corresponding to a cavity mode and a radial frequency corresponding to a radial mode, wherein the emission rings are assembled in groups of rings, the groups of rings comprising at least two groups of rings, each group of rings, of the groups of rings, comprising at least two rings, and an inter-ring spacing between the rings of one and the same group of rings are a function of the cavity frequency of the group of rings while an inter-group spacing between two successive groups of rings are a function of a frequency of operational use of the emission rings, wherein the inter-ring spacing between the rings of one and the same group of rings is furthermore chosen as a function of the radial frequency of the group of rings.

2. The omnidirectional antenna as claimed in claim 1, wherein the rings are made of piezoelectric material.

3. The omnidirectional antenna as claimed in claim 1, wherein the sum of the inter-group spacing between two groups of rings p, of the inter-ring spacing d between two of rings and of twice the height of a ring is substantially equal to half the wavelength of the frequency of operational use of the emission rings.

4. The omnidirectional antenna as claimed in claim 1, wherein the inter-ring spacing between two rings of one and the same group of rings is chosen so as to position the cavity frequency of the group of rings with respect to the radial frequency of the rings of the group of rings.

5. The omnidirectional antenna as claimed in claim 1, wherein the cavity frequency of each ring is coupled with the radial frequency of said ring.

6. The omnidirectional antenna as claimed in claim 1, wherein the internal cavity of each emission ring is in contact with said dielectric fluid.

7. The omnidirectional antenna as claimed in claim 1, wherein the antenna is housed in a leaktight enclosure filled with said dielectric fluid.

8. The omnidirectional antenna as claimed in claim 7, wherein the enclosure is over-pressurized.

9. The omnidirectional antenna as claimed in claim 7, wherein the enclosure is placed in hydrostatic equilibrium with the exterior medium.

10. The omnidirectional antenna as claimed in claim 1, wherein the rings are fed group-wise in parallel.

11. The omnidirectional antenna claimed in claim 1, wherein a group of rings comprising more than two rings and the inter-ring spacing between two rings of said group varies within the group.

12. The omnidirectional antenna claimed in claim 1, wherein the inter-group spacing between two groups of rings of the antenna varies for the assembly of groups of rings of the antenna.

13. The omnidirectional antenna as claimed in claim 1, wherein in the radial mode for a ring is obtained by alternate extension/compression of the material constituting the ring, and the cavity mode for a ring is obtained by causing the internal fluid included in the internal cavity to resonate.

14. The omnidirectional antenna as claimed in claim 13, wherein the cavity mode depends on the height of the ring.

* * * * *